US012602931B2

(12) United States Patent
Verbeke et al.

(10) Patent No.: US 12,602,931 B2
(45) Date of Patent: Apr. 14, 2026

(54) IDENTIFICATION OF UNKNOWN TRAFFIC OBJECTS

(71) Applicant: ZENSEACT AB, Gothenburg (SE)

(72) Inventors: Willem Verbeke, Gothenburg (SE); Olle Månsson, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 212 days.

(21) Appl. No.: 18/489,040

(22) Filed: Oct. 18, 2023

(65) Prior Publication Data

US 2024/0135719 A1    Apr. 25, 2024
US 2024/0233390 A9    Jul. 11, 2024

(30) Foreign Application Priority Data

Oct. 20, 2022    (EP) ..................................... 22202765

(51) Int. Cl.
*G06V 20/56*        (2022.01)
*B60W 60/00*        (2020.01)
            (Continued)

(52) U.S. Cl.
CPC ......... *G06V 20/56* (2022.01); *B60W 60/0027* (2020.02); *G06V 10/774* (2022.01);
            (Continued)

(58) Field of Classification Search
CPC .. G06V 10/774; G06V 10/7753; G06V 20/56; G06V 20/58; G06V 20/582;
            (Continued)

(56) References Cited

U.S. PATENT DOCUMENTS

2010/0104199 A1    4/2010  Zhang et al.
2019/0187720 A1*   6/2019  Fowe ................. G01C 21/3676
            (Continued)

FOREIGN PATENT DOCUMENTS

CN        108995655 B    4/2020
DE     102012112104 A1    6/2014

OTHER PUBLICATIONS

Kamoi, Ryo et al.; "Efficient Unknown Object Detection with Discrepancy Networks for Semantic Segmentation"; Machine Learning for Autonomous Driving Workshop at the 35th Conference on Neural Information Processing Systems (NeurIPS 2021); Sydney, Australia; 2021; 12 pages; XP093021817.

(Continued)

*Primary Examiner* — Erin D Bishop
*Assistant Examiner* — Brandon Z Willis
(74) *Attorney, Agent, or Firm* — Sage Patent Group

(57)        ABSTRACT
A method for generating training data for a machine learning (ML) algorithm configured for identification of an unknown traffic object present on a road is disclosed. The method includes obtaining sensor data from a sensor system of an ego vehicle travelling on the road, the sensor data including one or more images of a surrounding environment of the vehicle and speed information of the ego vehicle and/or speed of at least one external vehicle. The method further includes determining a presence of the unknown traffic object in the surrounding environment of the ego vehicle and determining a change of speed of the ego vehicle and/or of the at least one external vehicle. In an instance of a co-occurrence of the determined change of speed and the determined presence of the unknown traffic object, the method includes selecting one or more images of the at least one unknown traffic object.

14 Claims, 3 Drawing Sheets

(51) Int. Cl.
    *G06V 10/774*     (2022.01)
    *G06V 20/70*     (2022.01)

(52) U.S. Cl.
    CPC ....... *G06V 20/70* (2022.01); *B60W 2420/403* (2013.01); *B60W 2520/10* (2013.01); *B60W 2554/4042* (2020.02); *B60W 2556/45* (2020.02)

(58) Field of Classification Search
    CPC ... G06V 20/70; G06V 40/20; B60W 60/0027; B60W 2420/403; B60W 2520/10; B60W 2520/105; B60W 2554/4042; B60W 2554/20; B60W 2556/45; G06F 18/214; G06F 18/2148; G06F 18/2155; G06N 20/00
    See application file for complete search history.

(56) References Cited

U.S. PATENT DOCUMENTS

| | | | |
|---|---|---|---|
| 2020/0292322 | A1 | 9/2020 | Ozog et al. |
| 2021/0156696 | A1 | 5/2021 | Zhang et al. |
| 2022/0019813 | A1* | 1/2022 | Satoh ................... G08G 1/0112 |
| 2024/0127579 | A1* | 4/2024 | Capellier ............. G05D 1/0274 |
| 2024/0232715 | A9* | 7/2024 | Månsson .............. G06V 20/582 |
| 2025/0022278 | A1* | 1/2025 | Li ......................... G01S 17/931 |

OTHER PUBLICATIONS

Bogdoll, Daniel et al.; "Multimodal Detection of Unknown Objects on Roads for Autonomous Driving"; arxiv.org, Cornell University Library, Ithaca, NY; Jul. 2, 2022; 8 pages; XP091261553.
Du, Xuefeng et al.; "Unknown-Aware Object Detection: Learning What You Don't Know from Videos in the Wild"; arxiv.org, Cornell University Library, Ithaca, NY; Mar. 8, 2022; 17 pages; XP091178472.
Nartey, Obed Tettey et al.; "Robust Semi-Supervised Traffic Sign Recognition via Self-Training and Weakly-Supervised Learning"; SENSORS, vol. 20, No. 9; May 8, 2020; 24 pages; XP093022640, https://www.ncbi.nlm.nih.gov/pmc/articles/PMC7248915/pdf/sensors-20-02684.pdf.
Kosztolanyi-Ivan, Gabriella et al.; "Recognition of built-up and non-built-up areas from road scenes"; Eur. Transp. Res. Rev. (2016) 8: 17; Jun. 1, 2016; 9 pages.
Extended European Search Report mailed Mar. 28, 2021 for European Patent Application No. 22202765.8, 11 pages.

* cited by examiner

IDENTIFICATION OF UNKNOWN TRAFFIC OBJECTS

CROSS-REFERENCE TO RELATED APPLICATIONS

The present application for patent claims priority to European Patent Office Application Ser. No. 22202765.8, entitled "IDENTIFICATION OF UNKNOWN TRAFFIC OBJECTS" filed on Oct. 20, 2022, assigned to the assignee hereof, and expressly incorporated herein by reference.

TECHNICAL FIELD

The present disclosure relates to methods and systems for identifying unknown traffic objects on a road. More specifically, embodiments and aspects of the present disclosure relate to identification of unknown traffic objects being present in a surrounding environment of an ego vehicle travelling on the road and systems and methods for generating training data for a machine learning algorithm for identification of unknown traffic objects on the road.

BACKGROUND OF THE INVENTION

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc.—are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of or in tandem with a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

An important requirement for autonomous and semi-autonomous vehicles is to seamlessly implement interpretation of the content of roadside traffic objects such as traffic signs. Traffic sign recognition (TSR) techniques are thus under extensive development for achieving autonomous driving. One of the areas in which TSR is essential is in the determination of the current speed limit when driving. Speed limit signs are relatively straightforward to identify under most circumstances, but a crucial exception to this are traffic objects which do not directly depict specific speed limits but rather implicitly indicate adapting a certain speed embedded in their definition.

Currently, there are no feasible approaches for accurately detecting and categorizing these traffic objects due to an extremely broad variety of these traffic objects. More specifically, these types of traffic object are provisioned in various languages, include various symbols, signals or special characters, etc. having definitions applicable only in their respective geographical zones without complying with a globally agreed-upon standard. Thus, the extreme variety as well as the expected traffic behaviour imposed by such traffic objects, makes accurately detecting such traffic objects a substantial challenge. Challenges which the currently employed traffic sign detection systems and algorithms for detection of speed-limit signs are incapable of tackling.

There is thus a pressing need in the art for new and improved solutions for identification of unknown traffic objects, specifically unknown traffic objects having expected traffic behavior associated with their definition.

SUMMARY

It is therefore an object of the present invention to provide a system, a vehicle comprising such a system, a method, and a computer-readable storage medium, which alleviate all or at least some of the drawbacks of presently known solutions.

More specifically, it is an object of the present invention to alleviate problems related to identification of unknown traffic objects on a road and in a surrounding environment of a vehicle. The vehicle may comprise an ADS system.

These objects are achieved by means of a system, a vehicle comprising such a control system, a method, and a computer-readable storage medium, as defined in the appended independent claims. The term exemplary is in the present context to be understood as serving as an instance, example or illustration.

According to a first aspect of the present invention, there is provided a method for generating training data for a machine learning, ML, algorithm configured for identification of at least one unknown traffic object on a road. The method comprises obtaining sensor data from a sensor system of an ego vehicle travelling on the road, the sensor data comprising one or more images, captured by a vehicle-mounted camera, of a surrounding environment of the vehicle and information indicative of a speed of the ego vehicle and/or speed of at least one external vehicle. The method further comprise determining a presence of at least one unknown traffic object in the surrounding environment of the ego vehicle based on the obtained sensor data. Further, the method comprises determining a change of speed of the ego vehicle and/or of the at least one external vehicle travelling on the road and being present in the surrounding environment of the ego vehicle, based on the obtained sensor data. The change of speed corresponds to a substantially consistent new vehicle speed which is maintained by the ego vehicle and/or by the at least one external vehicle for at least a predetermined period of time. In an instance of a co-occurrence of i.e. determining of a co-occurrence of the determined change of speed and the determined presence of the at least one unknown traffic object in the surrounding environment of the ego vehicle, the method further comprises selecting one or more images of the at least one unknown traffic object for forming a training data set for the ML algorithm configured for identification of the at least one unknown traffic object. If a co-occurrence is not determined, the ego vehicle may revert to obtaining further sensor data or performing any of the previous method steps accordingly.

According to some embodiments, determining the new vehicle speed of the ego vehicle and/or of the at least one external vehicle may be based on a real-time change of vehicle speed based on the obtained sensor data.

In some embodiments the method may further comprise transmitting the selected one or more images of the at least one unknown traffic object to a remote server and/or storing the selected one or more images in a memory unit of the ego vehicle for a subsequent transmission to the remote server. The transmitted or stored images may be used for generating a corresponding traffic object identification annotation for the one or more images of the at least one unknown traffic object which may be used for forming the training data set for the ML algorithm.

In several embodiments, the method may further comprise obtaining a geographical positioning data of the ego vehicle corresponding to the co-occurrence of the determined change of speed and the determined presence of the at least one unknown traffic object in the surrounding environment of the ego vehicle. The method may further comprise associating the co-occurrence to the obtained geographical positioning data and determining a confidence value based on confidence criteria comprising a calculated frequency of the association of the co-occurrence to the obtained geographical positioning data. The method may further comprise selecting the one or more images of the at least one unknown traffic object for forming the training data set for the ML algorithm configured for identification of the at least one unknown traffic object if the determined confidence value exceeds a predetermined confidence threshold value.

According to several embodiments herein, the ego vehicle may comprise an Automated Driving System, ADS and that the method may be performed by a control system or processing unit of the ego vehicle.

In some embodiments according to the present disclosure the method may further comprise storing the one or more selected images in the memory unit of the ego vehicle for generating the corresponding traffic object identification annotation for the one or more images of the at least one unknown traffic object automatically by the ego vehicle or the processing circuitry of the ego vehicle. Automatically generated image annotations may be used for forming the training data set for the ML algorithm.

In some embodiments, the method may further comprise determining, based on the selected one or more images of the at least one unknown traffic object, that the at least one unknown traffic object is indicative of a built-up area. The method may further comprise generating the corresponding traffic object identification annotation for the selected one or more images of the at least one unknown traffic object indicative of the built-up area.

In some embodiments the method may further comprise indicating the at least one built-up area traffic object within map data associated with an HD map based on the annotated one or more images.

The present inventors have realized that by using a data-driven approach comprising the use of ML algorithms accuracy, scalability, speed and reproducibility can be achieved in identification of unknown roadside traffic objects. The data-driven approach of the present disclosure is also easier to maintain than any rule-based approach or any algorithm based on human intuition. Accordingly, algorithms and methods according to the present disclosure comprise machine learning algorithms capable of accurately and flexibly predicting and identifying an extremely large variety of unknown roadside traffic objects by observing certain driving behavior or behavior changes of the vehicles such as change of speed on the road. This can thus solve the problem of identification of roadside traffic objects in scenarios involving multiple environmental variables or conditions happening simultaneously or outside the conventional levels.

Further, accurate and reproducible identification of unknown traffic objects regardless of their variations e.g. some bearing imagery indications such as pictograms of houses or a city and some only comprising text and symbols is enabled. A task which is extremely challenging to solve by using the current logic-based approaches. Further, the versatility of the proposed solution establishes the proposed methods, and corresponding system and vehicle to be readily adaptable for varying traffic situations or road and transportation infrastructure in different countries.

According to a second aspect of the present disclosure there is provided a (non-transitory) computer-readable storage medium storing one or more programs configured to be executed by one or more processors of a processing system, the one or more programs comprising instructions for performing the method according to any one of the embodiments of the method disclosed herein.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure, there is provided a computer program product comprising instructions which, when the program is executed by one or more processors of a processing system, causes the processing system to carry out the method according to any one of the embodiments of the method disclosed herein.

According to a further fourth aspect, there is provided a system for generating training data for a machine learning, ML, algorithm configured for identification of at least one unknown traffic object on a road. The system comprises processing circuitry configured to obtain sensor data from a sensor system of an ego vehicle travelling on the road, the sensor data comprising one or more images, captured by a vehicle-mounted camera, of a surrounding environment of the vehicle and information indicative of a speed of the ego vehicle and/or speed of at least one external vehicle. The processing circuitry is further configured to determine a presence of at least one unknown traffic object in the surrounding environment of the ego vehicle based on the obtained sensor data. Further, the processing circuitry is configured to determine a change of speed of the ego vehicle and/or of the at least one external vehicle travelling on the road and being present in the surrounding environment of the ego vehicle, based on the obtained sensor data. The change of speed corresponds to a substantially consistent new vehicle speed which is maintained by the ego vehicle and/or by the at least one external vehicle for at least a predetermined period of time. In an instance of a co-occurrence of the determined change of speed and the determined presence of the at least one unknown traffic object in the surrounding environment of the ego vehicle, the processing circuitry is further configured to select one or more images of the at least one unknown traffic object for forming a training data set for the ML algorithm configured for identification of the at least one unknown traffic object.

According to yet another fifth aspect, there is provided a vehicle comprising one or more vehicle-mounted sensors configured to monitor a surrounding environment of the vehicle. The vehicle further comprises a localization system configured to monitor a pose of the vehicle i.e. geographical position and heading of the vehicle on a road. The vehicle further comprises a system according to the fourth aspect and various embodiments of the fourth aspect. The vehicle may further comprise an ADS system for controlling one or more of acceleration, steering, and braking of the vehicle.

Further embodiments of the different aspects are defined in the dependent claims.

It is to be noted that all the embodiments, elements, features and advantages associated with the first aspect also analogously apply to the second, third, fourth and the fifth aspects of the present disclosure.

These and other features and advantages of the present disclosure will in the following be further clarified in the following detailed description.

BRIEF DESCRIPTION OF THE DRAWINGS

Further objects, features and advantages of embodiments of the disclosure will appear from the following detailed description, reference being made to the accompanying drawings. The drawings are not to scale.

DETAILED DESCRIPTION

Figure 1:
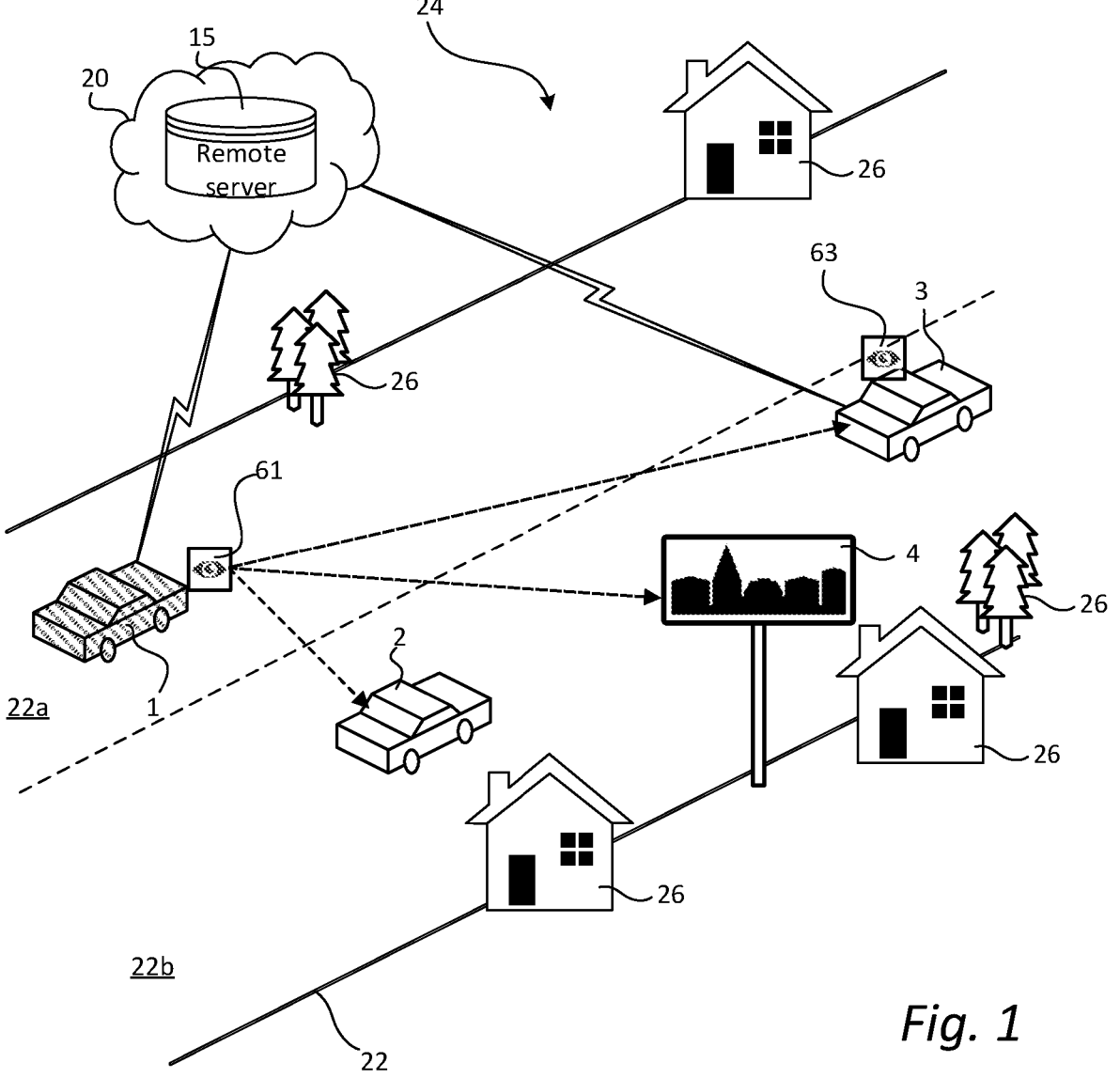
FIG. 1 shows a schematic top view of a road and at least one vehicle traveling on the road in accordance with several embodiments of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses or construction equipment.

FIG. 1 illustrates a schematic perspective top view of a vehicle 1 in a hatched line shaded pattern. The vehicle 1 may comprise an Automated Driving System (ADS). The vehicle 1 may also be referred to as the ego-vehicle. Moreover, FIG. 1 shows vehicle 2 and vehicle 3 which are traveling in the same area 24 as the ego vehicle 1. The area 24 comprises a road 22 having at least one lane such as lanes 22*a* and 22*b*. In the present context, the ADS comprises both ADAS and AD systems. In some embodiments, the ADS of the ego vehicle may comprise one or more ADS features that are preferably a level 2 feature or higher according to SAE J3016 levels of driving automation for on-road vehicles. In the present context, an ADS feature may be in the form of an autopilot feature, a traffic jam pilot, a highway pilot, or any other SAE J3016 level 2+ ADS feature. In various implementations, the vehicles with low-level ADS systems such as ADS level 0-3 may be vehicles having ADAS systems capable of employing their integrated sensor systems, etc. for surveillance of the surrounding environment of the vehicle, displaying information such as warning signals etc. to the driver of the vehicle. The ego vehicle 1 in some embodiments may be equipped with high-level ADS systems such as level 4-5 having AD systems for autonomously controlling steering functions of the ego vehicle 1. The external vehicles on the road such as vehicles 2 or 3 shown in FIG. 1 may be equipped with any level of ADS or lack such systems entirely. In some embodiments and implementations, there might be more than one ego vehicle 1 present in the same area 24 simultaneously or at different points in time and thus data from one or more ego vehicles 1 may be collected and analyzed.

The ego vehicle 1 comprises a control system 10 which may be a separate entity or may be a part of the overall ADS architecture of the vehicle, and may accordingly be a module or component of the ADS. The control system 10 of the vehicle 1 comprises control circuitry 11 or processing circuitry 11 configured to obtain data comprising information about the surrounding environment of the vehicle 1. The vehicle is also provided with a localization system 5 which in communication with the control system 10 are configured to provide an estimation of the ego vehicle's 1 state or pose i.e. vehicle's geographical position and heading on the road 22.

The area 24 in FIG. 1 comprises urban infrastructure 26 such as buildings, houses, residential complexes, green areas, playgrounds, etc.

In several examples and embodiments the road 22 may be any type of road e.g. part of a motorway, freeway or expressway. The road may also be a country road, rural road or any other carriageway. The road may have a plurality of lanes such as more than one lane in the same travelling direction e.g. two or more lanes 22*a*, 22*b* or at least one lane in each travelling direction as is usually the case for rural roads. There is at least one roadside traffic object 4 with an unknown identity present in the area 24 and on the road 22. By the unknown traffic object in the present context it is meant a traffic object which is detected by, but the definition of which is unidentified to the ego vehicle 1 travelling on the road 22, and which is not a conventional speed limit sign or any other traffic sign which can otherwise be identified from a list of known traffic objects available to the ego vehicle 1 at the time of encounter.

The roadside unknown traffic object in the present context may be construed as comprising unknown traffic signs, traffic signals such as traffic lights, warning signals etc., speed bumps, or any traffic object associated with the area 24. In several embodiments and aspects the area 24 may be a built-up area. The built-up area 24 may be associated with observing specific traffic behavior such as specific speed limits to be obeyed by the passing traffic, certain considerations concerning human safety such as presence of children's playground, etc. Thus, the one or more unknown traffic objects 4 erected in the built-up areas 24 may have an implicit traffic behavior e.g. a certain speed limit embedded in their traffic definition. The ego vehicle 1 may not be informed or cautioned about the area 24 being a built-up area 24 in advance. Furthermore, the traffic objects 4 such as the traffic sign 4 in FIG. 1 and its specific meaning may be unknown for the ego vehicle 1.

Figure 2:
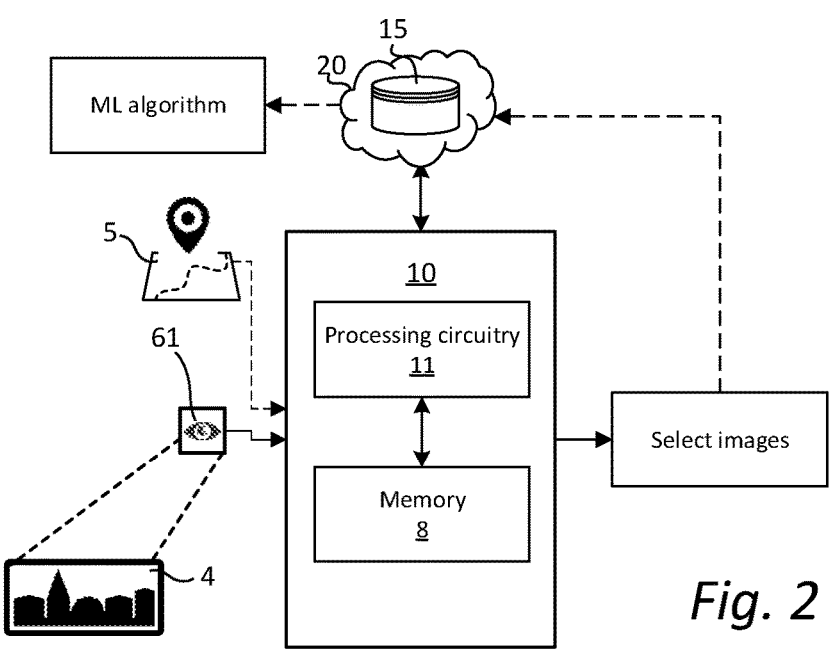
FIG. 2 shows a schematic block diagrams of a control system of the vehicle in accordance with several embodiments of the present disclosure.

In some embodiments and aspects, for instance as shown in FIG. 2, the control system 10 of vehicle 1 may be configured to determine the geographical position and heading of the vehicle 1 on the road 22 based on data from the localization system 5 comprising positioning data indicating a pose, i.e. position and orientation, of the vehicle on the road portion 24, map data associated with the road 22 and the area 24 if available and sensor data obtained by the from a perception system i.e. sensor system 61 of the ego vehicle 1. In several embodiments, the vehicle may utilize a localization system 5 in the form of a suitable satellite based positioning systems, such as either one of a GNSS or a corresponding regional system such as e.g. a GPS, Globalnaya Navigazionnaya Sputnikovaya Sistema (GLONASS), Galileo, Beidou, etc.

The localization system 5 may comprise or be associated with an HD-map module. An HD-map is in the present context to be understood as map comprising data with highly accurate and realistic representations of the road travelled upon by the vehicle 1. In more detail HD-maps may be understood as maps that are particularly built for autonomous driving purposes. These maps have an extremely high precision, oftentimes at a centimeter-level. Moreover, the maps generally contain information such as where the lanes are, where the road boundaries are, where the curves are, how high the curves are, and so forth.

In several aspect and embodiments, the control system 10 or processing unit 10 of ego vehicle 1 as shown in FIG. 2 is configured for identification of at least one unknown traffic object 4 on the road 22. In several aspect and embodiments, the control system of the ego vehicle 1 may be configured for generating training data for a machine learning, ML, algorithm, wherein the ML algorithm is configured for identification of the at least one unknown traffic object 4 on the road 22. The control system 10 is configured for obtaining sensor data from a sensor system 61 of the ego vehicle 1 travelling on the road 22. The obtained sensor data may comprise information about a state of one or more other external vehicles 2, 3 in the surrounding environment of the ego-vehicle, lane marker geometry on the one or more lanes of the road 22, lane marker type (e.g. solid, dashed, double marker, etc.) on the road 22, traffic sign information 4, road barrier information such as presence or characteristics of speed bumps or any other road obstruction objects, etc. The control system 10 may in various aspects and embodiments comprise or be associated with an Inertial Measurement Unit (IMU). An IMU may be understood as a device configured to detect linear acceleration using one or more accelerometers and rotational rate using one or more gyroscopes. Thus, in some embodiments, the sensor data may further comprise sensor data obtained from the IMU. The output from the IMU is then used to estimate a change in the vehicle's pose over time. In several embodiments, the sensor data comprises one or more images which may be captured by a vehicle-mounted camera 61 (not shown) as a part of the sensor system 61. The captured images may be stored locally in a memory 8 of the ego vehicle 1 and/or be transmitted to an external network 20 like a cloud network 20, with which the ego vehicle 1 is in communication. The camera 61 in the present context also includes a plurality of vehicle-mounted cameras 61 (not shown) mounted on several parts of the ego vehicle 1 for capturing images of a surrounding environment of the ego vehicle 1. In several embodiments the control system 10 is configured for obtaining information indicative of a speed of the ego vehicle 1 and/or speed of the at least one external vehicle 2, 3 being present in the surrounding environment of the ego vehicle 1 and travelling on the road 22 in the area 24. The information indicative of the speed of the vehicles may be provided by the processing circuitry 11 of the control system 10 by processing the obtained sensor data by the sensor system 61 of the ego vehicle 1. The control system 10 of the ego vehicle 1 determines a presence of at least one unknown traffic object 4 in the surrounding environment of the ego vehicle 1 based on the obtained sensor data. Further, the control system 10 is configured to determine a change of speed of the ego vehicle 1 and/or of the at least one external vehicle 2, 3 based on the obtained sensor data. Stated differently, based on the obtained information concerning the speed of the ego vehicle 1 and/or speed of the at least one external vehicle 2, 3, the control system 10 determines if the ego vehicle 1 or any one of the external vehicles 2, 3 has changed its speed at a specific point in time compared to its previously-registered speed by the control system 10. When such a change in speed is determined by the control system 10, it is further determined if that determined change of speed corresponds to a substantially consistent new vehicle speed for the ego vehicle 1 and/or for the at least one external vehicle 2, 3. It is also determined if the new vehicle speed is maintained by the ego vehicle 1 and/or by the at least one external vehicle 2, 3 for at least a predetermined period of time. The new vehicle speed may be a speed which is lower than the previously registered speed of the vehicles. The new vehicle speed may be maintained without any abrupt changes in acceleration of the vehicles such as without any bursts in vehicle acceleration, etc. The new vehicle speed may be a specific speed according to traffic rules associated with built-up or residential areas and the actual registered new vehicle speed may be within a regular tolerance range around that specific speed.

The predetermined time period may be decided upon based on historic data associated with the geographical expansion of areas similar to area 24 which may have been previously identified as built-up or residential areas. The predetermined period of time may be an average period of time exceeding an expected period of time required for driving over a normal speed bump or an unexpected road obstruction or an expected traffic jam in the area 24. The predetermined period of time may be determined based on the map data of the area 24. The predetermined period of time may in some examples be any suitable time period such as 30 seconds, 60 seconds, 90 seconds, 120 seconds, etc. as a design parameter and e.g. be decided by the control system 10 during which the new vehicle speed is determined to be maintained.

The maintenance of the new vehicle speed for the predetermined period of time is used as an indicative parameter for establishing that the change of speed behaviour is associated with an expected traffic behaviour imposed by the identified unknown traffic object 4. For example, the control system 10 determines that either one of the vehicles 1, 2, 3 at timestamp t1 may have an average speed of V1=80 km/hour and at the timestamp t2 maintain a new speed V2=50 km/hour±ΔV, wherein the ΔV is an acceptable tolerance range around V2. The change of speed from V1 to V2 is determined to have occurred between timestamps t1 and t2 and has been maintained by the detected vehicle 1, 2, 3 for a predetermined period of time ΔT.

Since the new speed of the detected vehicle 1, 2, 3 is determined by the control system 10 to not fall below a speed level of moving vehicles in a traffic flow, and since no burst of acceleration is detected under the predetermined time period ΔT, the control system 10 determines that V2 is an implied speed limit expected in the area 24. In some examples, when ΔT exceeds a predetermined threshold value required for passing over a regular speed bump or the like, then the change of speed to V2 is recorded as an area 24 speed restriction followed by the ego vehicle 1 and/or by the external vehicles 2, 3. Co-occurrence of determination of the speed change to V2 with identification of the unknown traffic object 4 is then determined and recorded by the control system 10.

Co-occurrence or coincidence in the present context is to be construed as two or more events occurring together or simultaneously. Stated differently, the co-occurrence of two events describes and comprises either both events happening at the same time or one event happening at a first instance and the other event happening in a second instance different from the first instance, but being related to the happening of the event of the first instance. For example, the first event and the second event may both happen at the same time and in the same geographical location. In some other scenarios, the first event may happen and be registered at a first instance, but the second event may happen in the same geographical location as the first event but at a different point in time than the first instance. In either case, the first and the second events may be described as have been co-occurred. Parameters such as the first and second instances as well as the geographical location associated with occurrences of the first and the second events as explained above need not be precise parameters e.g. an exact point in time and may evidently cover scenarios involving an acceptable range of tolerances for each parameter. As described in the previous example, the first event may be identification of the unknown traffic object 4 in the area 24 and the second event determination of the change of speed by the ego vehicle and/or at least one external vehicles 2, 3 in the same area 24.

In another example with reference to FIG. 1, the ego vehicle 1 may comprise an ADS level 4 system driving in autonomous mode. The external vehicle 2 does not comprise any ADS system and the external vehicle 3 comprises ADS level 2 or above also having a perception system 63. The control system 10 of the ego vehicle 1 determines presence of an unknown roadside traffic object 4 in the area 24 into which the ego vehicle 1 has just entered. Based on the obtained sensor data, the ego vehicle 1, also monitors the behaviour changes in the external vehicles 2, 3 and determines a speed change in vehicle 2 which due to its position on the road 22 can also be said to have identified the presence of the traffic sign 4. Furthermore, the change of speed in vehicle 3 is also determined, even after it has passed the traffic sign 4, but is still identifiable by the sensor system 61 of the ego vehicle 1. In an instance i.e. upon determination of the co-occurrence of the determined change of speed in vehicles 2 and/or 3 and the determined presence of the at least one unknown traffic object 4 in the surrounding environment of the ego vehicle 1 by the control system 10, the control system selects one or more images of the obtained images of the at least one unknown traffic object 4.

It should be appreciated that the order with which the unknown traffic sign 4 is identified or the change of speed of the vehicles 1, 2, 3 is determined by the control system 10 may be solely based on the system implementation, with either parameter being obtained, processed and provisioned before or after the other. The control system 10 may be further configured to obtain historic speed data and/or data associated with the change of speed behavior of the ego vehicle 1 and/or the external vehicles 2, 3 from the cloud network 20. In some embodiments and examples, the change of speed of the ego vehicle and/or the external vehicles may be determined by the control system 10 prior to identification of the presence of the unknown road side traffic object 4. In some embodiments, determination of the change of speed of the ego vehicle 1 and/or the external vehicles 2, 3 may be the trigger event for observations made by the sensor system 61 of the ego vehicle 1 for determination of presence of the unknown traffic object 4. In either of these examples and scenarios the co-occurrence of the first event with the second event will be determined regardless of order of determination. In some embodiments, the ego vehicle 1 driving on the autonomous mode may simply be configured to perform a change of behavior like change of speed to a lower speed than its current speed upon observation of presence of an unknown roadside traffic object like the traffic sign 4 in FIG. 1. The speed and change in the speed of the external vehicles 2, 3 may also be observed in such an event to also determine occurrence of a change of behavior in the external vehicles 2, 3. In some examples, a change in the driving behavior e.g. the speed change of the ego vehicle 1 and/or the at least one external vehicle 2, 3 may comprise a change of behavior e.g. reducing speed performed by a human driver of the vehicles. In an instance that the observation of the roadside traffic object 4 and the change of speed of vehicles is established by the control system 10, the obtained images of the unknown traffic sign 4 may be selected for the purpose of identification of the unknown object 4.

These selected images may then be tagged by the control system 10 as candidates to be used for accurate identification of the at least one unknown traffic object 4. Even further, in several embodiments and aspects the tagged images may be used for forming a training data set for the ML algorithm configured for identification of the at least one unknown traffic object 4.

Accordingly, the inventors have realized that by using a data-driven approach comprising the use of ML algorithms accuracy, scalability, speed and reproducibility can be achieved in identification of unknown roadside traffic objects. The data-driven approach of the present disclosure is also easier to maintain than any rule-based approach or any algorithm based on human intuition. Accordingly, algorithms and methods according to the present disclosure comprise machine learning algorithms capable of accurately and flexibly predicting and identifying an extremely large variety of unknown roadside traffic objects by observing certain driving behavior or behavior changes of the vehicles on the road. This can thus solve the problem of identification of roadside traffic objects in scenarios involving multiple environmental variables or conditions happening simultaneously or outside the conventional levels. Machine learning algorithms in the present context may comprise supervised machine learning algorithms, trained, tested and verified based on conventional real-world data which is obtained through driving the ego vehicle 1 on various types of roads under a variety of environmental conditions and for suitable periods of time to collect and evaluate the data sets. In some examples, HD-map data, positioning data, various sensor measurements including camera, radar, LIDAR, GNSS, IMU, pose and driving behavior of other external vehicles in the surrounding environment of the ego-vehicle 1, geometry and type of lane markers, traffic signs and traffic information, road barriers, weather forecast, etc. may optionally be employed as input data for training the ML algorithm.

In several embodiment and aspects, determining the new vehicle speed of the ego vehicle 1 and/or of the at least one external vehicle 2, 3 may be based on a real-time change of vehicle speed determined based on the obtained sensor data.

Additionally or alternatively, the new vehicle speed may be determined based on historic data of change of vehicle speed obtained from a remote server 15 comprised in or in communication with the cloud network 20 being in communication with the ego vehicle 1 and/or the at least one external vehicle such as vehicle 3 in FIG. 1. The historic data may be gathered by a fleet of vehicles in communication with the remote server 15 and then inquired and obtained by the control system 10 of the ego vehicle 1 upon determination of presence of an unidentified traffic object 4 in the area 24. The real-time and/or historic data may be used in tandem or separately. In an example, the ego vehicle 1 may be the only vehicle travelling in the area 24 at a certain time point without any other external vehicles 2, 3 being present. In such a scenario, upon identification of an unknown traffic sign 4 in the area, the ego vehicle 1 may send an inquiry to the external network 20 to fetch an average speed reduction or change of speed in the area 24 based on historic data obtained and stored in the remote server 15 previously e.g. during a specific time period or timestamp prior to the present time of passing of the ego vehicle 1. If a changed speed behavior has been registered for the vehicles passing through the same geographical location of area 24, this incident may also be recorded as a co-occurrence of determination of a change of speed and identification of an unknown traffic sign 4 in that area.

In several embodiments, the ego vehicle 1 may transmit the selected one or more images of the at least one unknown traffic object 4 to the remote server 15. In several embodiments the ego vehicle 1 may store the selected one or more images in the memory unit 8 of the ego vehicle 1 for a subsequent transmission to the remote server 15. The selected one or more images may be used for generating a corresponding traffic object identification annotation for the one or more images of the at least one unknown traffic object 4. The generated annotation may be used for forming the training data set for the ML algorithm. Stated differently, the tagged images of the unknown traffic object 4 which has been selected as candidates for identification of the at least one traffic object 4 are sent to the remote server 15, where they are to be annotated manually e.g. by human operators or automatically.

In some examples a neural network algorithm may be used for producing auto-annotations. The annotated images correspond to the identified unknown traffic object 4 and may be used for training the ML algorithm configured for identification of the at least one unknown traffic object 4.

In some embodiments the control system 10 may further be configured for obtaining a geographical positioning data of the ego vehicle 1 from the localization system 5 corresponding to the co-occurrence of the determined change of speed and the determined presence of the at least one unknown traffic object 4 in the area 24. The control system 10 may also be configured for associating the co-occurrence to the obtained geographical positioning data. In other words, the geographical location where an event of spotting the unknown traffic object 4 and an event of a change of speed behavior to a new speed have occurred in tandem are collected and registered every time such a co-occurrence is determined. It should be appreciated that more than one ego vehicle 1 may be present in the same area 24 at the same time i.e. co-occurrence of events recorded by each ego vehicle 1 having the same timestamp for the same geographical position. Consequently each vehicle may determine the co-occurrence of the event of presence of the unknown traffic object 4 and the event of speed change and also collect and register the associated geographical positioning data separately. Similarly, the co-occurrence of events and associated geographical location may be determined and registered by each of the one or more ego vehicles 1 which may be present on the road 22 and in the area 24 at different times i.e. co-occurrence of events having different timestamps for the same geographical position. The control system 10 of the ego vehicle 1 may also be configured for determining a confidence value based on confidence criteria comprising a calculated frequency of the association of the co-occurrence to the obtained geographical positioning data. Stated differently, the rate of recurrence of the association of a specific geographical position to the co-occurrence of the events of determination of presence of the unknown traffic object 4 and the new vehicle speed adapted by the ego vehicle 1 and/or the at least one external vehicles 2, 3 travelling in the area 24 are calculated by the control system 10. When the control system 10 determines that the determined confidence value exceeds a predetermined confidence threshold value, the control system 10 then selects the one or more images of the at least one unknown traffic object 4. The tagged one or more images are then used for generating image annotations and identification of the at least one unknown traffic object 4. In several embodiments the tagged one or more images are used for forming the training data set for the ML algorithm configured for identification of the at least one unknown traffic object 4. This way, by geographical aggregation of data from several sources, the accuracy and dependability of the collected data and the generated image annotations is significantly improved.

In some embodiments, the confidence value may only be calculated as representing the frequency of the association of the co-occurrence to the obtained geographical positioning data regardless of the number of ego vehicles 1 registering such events or the timestamps of such registrations. In other words, the co-occurrence or association may be registered by a single ego vehicle 1 or by a plurality of ego vehicles 1 in the area 24 at a single instance having a single timestamp or in several instances having differing timestamps. As long as an association between the co-occurrence of the events of determination of the unknown traffic object 4 and the change of speed is determined and associated to the geographical location, it is taken into account for calculation of the confidence value.

Additionally or alternatively calculation of the confidence value may be based on rate of recurrence of the co-occurrence of events of determination of the unknown traffic object 4 and the change of speed behavior registered by a predetermined number of ego vehicles 1 at a certain instance having the same timestamp. Additionally or alternatively, the calculation of the confidence value may be based on registration of the co-occurrence of events by a predetermined number of ego vehicles 1 for a predetermined number of times i.e. at two or more instances with different timestamps, which may exceed a threshold value.

Additionally or alternatively the confidence criteria may comprise at least a single instance wherein the co-occurrence of events is registered for a predetermined number of ego vehicles 1 and/or at least one external vehicle 2, 3 changing speed behavior in a sub-area of a certain extent e.g. having a predetermined radius and being comprised in the area 24. Consequently, the confidence value may be calculated based on the predetermined number of ego vehicles 1 and/or one or more external vehicles 2, 3 adapting and maintaining the new vehicle speed at a certain instance and within the sub-area with the predetermined geographical expansion.

In some embodiments, the control system 10 may be configured for storing the one or more selected images i.e. tagged images in the memory unit 8 of the ego vehicle 1 for generating the corresponding traffic object identification annotation for the one or more images of the at least one unknown traffic object and for forming the training data set for the ML algorithm. In other words, the ego vehicle 1 is configured for automatically generating the image annotations corresponding to the at least one unknown traffic object 4 by means of the processing circuitry 11 of the control system 10 of the vehicle and without the need for transmission of the tagged images to a remote server for off-site processing.

In several embodiments, the control system 10 may further be configured for determining, based on the selected one or more images of the at least one unknown traffic object 4, that the at least one unknown traffic object 4 is indicative of a built-up area 24. Moreover, the control system 10 may be configured for generating the corresponding traffic object identification annotation for the one or more images of at least one unknown traffic object 4, being indicative of the built-up area 24. This way, an advantage is provided by the proposed system and methods wherein the ego vehicle 1 utilizes the determined co-occurrence of the change of speed and the determined presence of the at least one unknown traffic object 4 in the area 4 for establishing an identity of the area 24 being a built-up 24 or residential area 24.

In some embodiments the control system 10 may also be configured to indicate the at least one built-up area traffic object 4 within map data associated with an HD map based on the annotated one or more images. Thus, the proposed systems and methods also provide the advantage of populating an HD-map with the location and definition of the identified built-up area traffic objects 4 in an automated manner.

Figure 3:
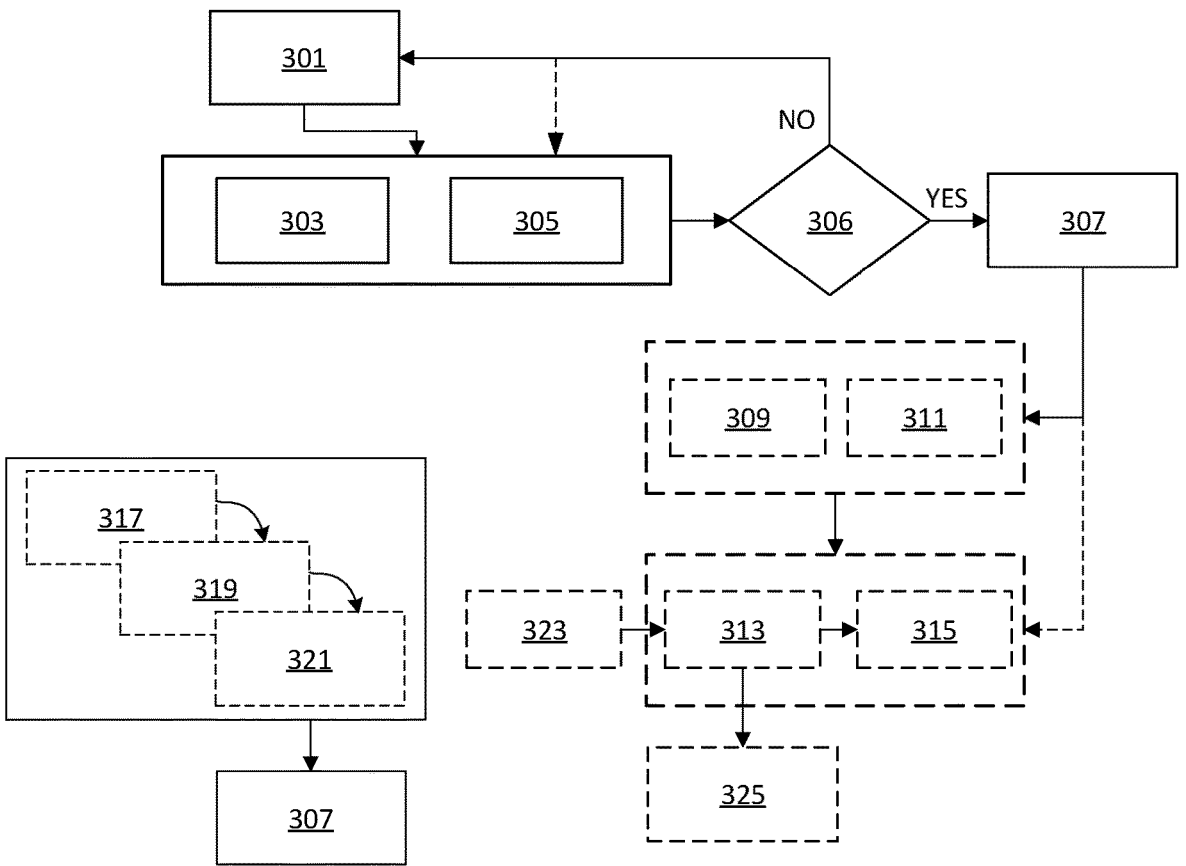
FIG. 3 is a schematic flowcharts illustrating a method in accordance with several embodiments of the present disclosure.

FIG. 3 shows a flowchart of a method 300 according to various aspects and embodiments of the present disclosure for generating training data for a machine learning, ML, algorithm configured for identification of at least one unknown traffic object 4 on a road 22. The method comprises obtaining 301 sensor data from a sensor system of an ego vehicle travelling on the road, the sensor data comprising one or more images, captured by a vehicle-mounted camera, of a surrounding environment of the vehicle and information indicative of a speed of the ego vehicle and/or speed of at least one external vehicle. The method further comprises determining 303 a presence of at least one unknown traffic object in the surrounding environment of the ego vehicle based on the obtained sensor data. Further, the method comprises determining 305 a change of speed of the ego vehicle and/or of the at least one external vehicle travelling on the road and being present in the surrounding environment of the ego vehicle, based on the obtained sensor data. The change of speed corresponds to a substantially consistent new vehicle speed which is maintained by the ego vehicle and/or by the at least one external vehicle for at least a predetermined period of time. In an instance of a co-occurrence 306 of i.e. determining 306 a co-occurrence of the determined change of speed and the determined presence of the at least one unknown traffic object in the surrounding environment of the ego vehicle, the method further comprises selecting 307 one or more images of the at least one unknown traffic object for forming a training data set for the ML algorithm configured for identification of the at least one unknown traffic object. If a co-occurrence is not determined, the ego vehicle may optionally revert to obtaining further sensor data or performing any of the previous method steps accordingly.

It is to be noted that all the embodiments, elements, features, examples and advantages described earlier with reference to the control system 10, or the processing circuitry 11 of the control system 10 and FIGS. 1-2 also analogously and equally apply to various embodiments of the methods 300 described herein with reference to FIG. 3.

According to some embodiments, determining 305 the new vehicle speed of the ego vehicle and/or of the at least one external vehicle is based on a real-time change of vehicle speed based on the obtained sensor data.

In some embodiments the method 300 may further comprise transmitting 309 the selected one or more images of the at least one unknown traffic object to a remote server 15 and/or storing 311 the selected one or more images in a memory unit 8 of the ego vehicle 1 for a subsequent transmission to the remote server 15. The transmitted or stored images may be used for generating 313 a corresponding traffic object identification annotation for the one or more images of the at least one unknown traffic object 4 which may be used for forming 315 the training data set for the ML algorithm.

In several embodiments, the method 300 may further comprise obtaining 317 a geographical positioning data of the ego vehicle 1 corresponding to the co-occurrence of the determined change of speed and the determined presence of the at least one unknown traffic object 4 in the surrounding environment of the ego vehicle 1. The method 300 may further comprise associating 319 the co-occurrence to the obtained geographical positioning data and determining 321 a confidence value based on confidence criteria comprising a calculated frequency of the association of the co-occurrence to the obtained geographical positioning data. The method 300 may further comprise selecting 307 the one or more images of the at least one unknown traffic object for forming 315 the training data set for the ML algorithm configured for identification of the at least one unknown traffic object if the determined confidence value exceeds a predetermined confidence threshold value.

According to several embodiments herein, the ego vehicle may comprise an Automated Driving System, ADS and that the method 300 may be performed by a control system 10 or processing unit 11 of the ego vehicle.

In some embodiments according to the present disclosure the method 300 may further comprise using the one or more selected images of the traffic object 4 for generating 313 the corresponding traffic object identification annotation for the one or more images of the at least one unknown traffic object 4 automatically by the ego vehicle 1 or the control system 10 or processing circuitry 11 of the ego vehicle 1.

More specifically, the method 300 may further comprise storing 311 the one or more selected images in the memory unit 8 of the ego vehicle 1 for generating 313 the corresponding traffic object identification annotation for the one or more images of the at least one unknown traffic object automatically by the ego vehicle or the control system 10 of the ego vehicle 1. Automatically generated image annotations may be used for forming 315 the training data set for the ML algorithm.

In some embodiments, the method 300 may further comprise determining 323, based on the selected one or more images of the at least one unknown traffic object 4, that the at least one unknown traffic object is indicative of a built-up area. The method may further comprise generating 313 the corresponding traffic object identification annotation for the selected one or more images of the at least one unknown traffic object 4 indicative of the built-up area.

In some embodiments the method 300 may further comprise indicating 325 the at least one built-up area traffic object 4 within map data associated with an HD map based on the annotated one or more images.

Executable instructions for performing these functions and method steps are, optionally, included in a non-transitory computer-readable storage medium or other computer program product configured for execution by one or more processors.

Figure 4:
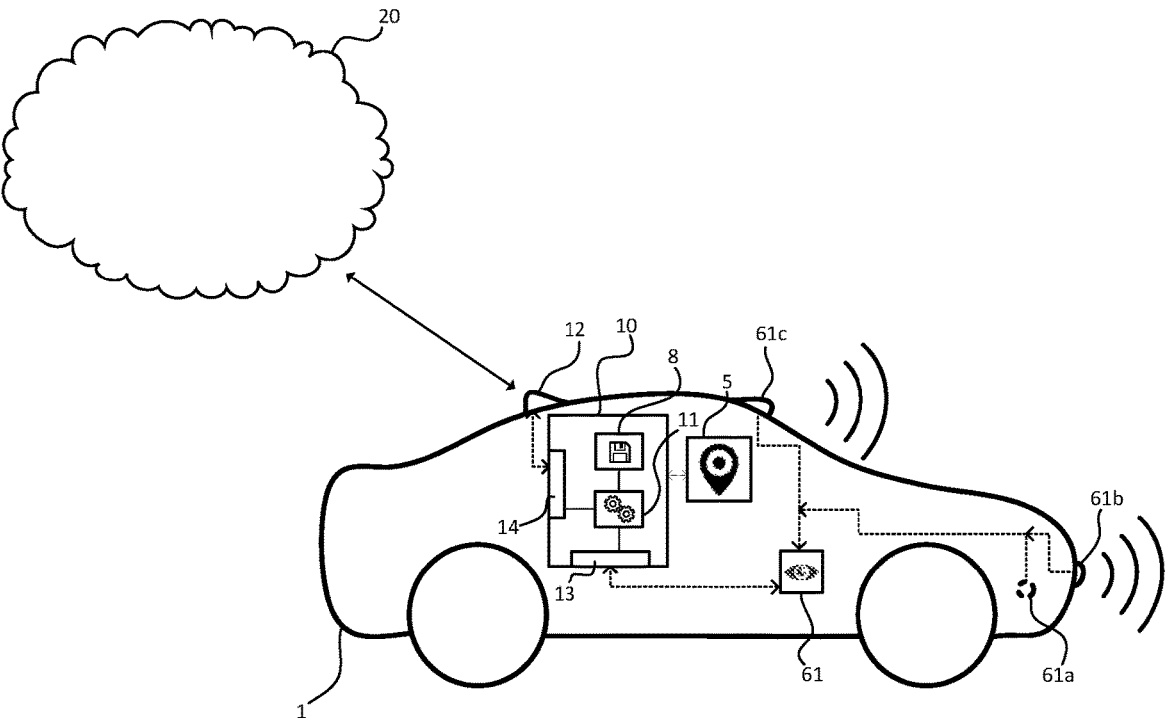
FIG. 4 shows a schematic side view illustration of the vehicle comprising the control system in accordance with some embodiments of the present disclosure.

FIG. 4 is a schematic side view of an ego vehicle 1 comprising a control system 10 (control device 10) for generating training data for a machine learning, ML, algorithm configured for identification of at least one unknown traffic object 4 on a road 22. The ego vehicle 1 further comprises a perception system 61, also referred to as the sensor system 61, and a localization system 5. A perception system 61 is in the present context to be understood as a system responsible for acquiring raw sensor data from on sensors 61a, 61b, 61c such as cameras, LIDARs and RADARs, ultrasonic sensors, and converting this raw data into scene understanding. In particular, the ego vehicle 1 has at least one vehicle-mounted camera 61c for capturing images of (at least a portion of) a surrounding environment of the vehicle including images of the roadside traffic objects. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, in the present context the vehicle 1 is assumed to have access to a digital map (e.g. a HD-map), either in the form of a locally stored digital map or via a remote data repository accessible via an external communication network 20 (e.g. as a data stream). In some embodiments, the access to the digital map may for example be provided by the localization system 5.

The control system 10 comprises one or more processors 11, a memory 8, and may comprise additional modules or units such as a sensor interface 13 and a communication interface 14. The processor(s) 11 may also be referred to as a control circuit 11 or control circuitry 11 or processing circuitry 11 or processing unit 11. The control circuit 11 is configured to execute instructions stored in the memory 8 to perform any one of the embodiments of the method 300 disclosed herein. The memory 8 of the control device 10 may include one or more (non-transitory) computer-readable storage mediums, for storing computer-executable instructions, which, when executed by one or more computer processors 11, for example, can cause the computer processors 11 to perform the techniques described herein. The memory 8 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the ego vehicle 1 may be connected to external network(s) 20 via for instance a wireless link (e.g. for retrieving map data). The same or some other wireless link may be used to communicate with other external vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. In several aspects and embodiments, there is provided a computer program product comprising instructions which, when the program is executed by one or more processors of a processing system, causes the processing system to carry out the method according to any one of the embodiments of the method of the present disclosure.

Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 8. The device 10 may have an associated memory 8, and the memory 8 may be one or more devices for storing data and/or computer code for completing or facilitating the various methods described in the present description. The memory may include volatile memory or non-volatile memory. The memory 8 may include database components, object code components, script components, or any other type of information structure for supporting the various activities of the present description. According to an exemplary embodiment, any distributed or local memory device may be utilized with the systems and methods of this description. According to an exemplary embodiment the memory 8 is communicably connected to the processor 11 (e.g., via a circuit or any other wired, wireless, or network connection) and includes computer code for executing one or more processes described herein.

It should be appreciated that the ego vehicle 1 further comprises a sensor interface 13 which may also provide the possibility to acquire sensor data directly or via dedicated sensor control circuitry 61 in the vehicle. The ego vehicle 1 also comprises a communication/antenna interface 14 which may further provide the possibility to send output to a remote location (e.g. remote operator or control centre) by means of an antenna 12. Moreover, some sensors in the vehicle may communicate with the control device 10 using a local network setup, such as CAN bus, I2C, Ethernet, optical fibers, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in the remote server 15 in communication with the vehicle, a so called cloud solution. In some examples, the ML algorithm may be implemented in the processing circuitry 11. In some examples, sensor data may be sent to an external system, wherein the external system comprises the ML algorithm configured for identification of at least one unknown traffic object 4 on the road 22. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

As used herein, the term "if" may be construed to mean "when" or "upon" or "in response to determining" or "in response to detecting" depending on the context. Similarly, the phrase "if it is determined" or "when it is determined" or "in an instance of" may be construed to mean "upon determining" or "in response to determining" or "upon detecting and identifying occurrence of an event" or "in response to detecting occurrence of an event" depending on the context. The term "obtaining" is herein to be interpreted broadly and encompasses receiving, retrieving, collecting, acquiring, and so forth directly and/or indirectly between two entities configured to be in communication with each other or with other external entities.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, in some cases some of the software implementations may be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A computer-implemented method for generating training data for a machine learning (ML) algorithm configured for identification of at least one unknown traffic object on a road, the method comprising:

obtaining, by a processing unit of a vehicle, sensor data from a sensor system of an ego vehicle travelling on the road, the sensor data comprising one or more images, captured by a vehicle-mounted camera, of a surrounding environment of the vehicle and information indicative of a speed of the ego vehicle and/or speed of at least one external vehicle;

determining, by the processing unit, a presence of at least one unknown traffic object in the surrounding environment of the ego vehicle based on the obtained sensor data;

determining, by the processing unit, a change of speed of the ego vehicle, and/or of the at least one external vehicle travelling on the road and being present in the surrounding environment of the ego vehicle, based on the obtained sensor data; wherein, said change of speed corresponds to a substantially consistent new vehicle speed which is maintained by the ego vehicle and/or by the at least one external vehicle for at least a predetermined period of time; and in an instance of a co-occurrence of the determined change of speed and the determined presence of the at least one unknown traffic object in the surrounding environment of the ego vehicle:

automatically selecting and storing, by the processing unit, one or more images of the at least one unknown traffic object for forming a training data set for the ML algorithm configured for identification of the at least one unknown traffic object.

2. The computer-implemented method according to claim 1, wherein determining the new vehicle speed of the ego vehicle and/or of the at least one external vehicle is based on a real-time change of vehicle speed based on the obtained sensor data.

3. The computer-implemented method according to claim 1, wherein the method further comprises:

transmitting, by the processing unit, the selected one or more images of the at least one unknown traffic object to a remote server and/or storing the selected one or more images in a memory unit of the ego vehicle for a subsequent transmission to the remote server, for generating a corresponding traffic object identification annotation for the one or more images of the at least one unknown traffic object for forming the training data set for the ML algorithm.

4. The computer-implemented method according to claim 1, wherein the method further comprises:

obtaining, by the processing unit, a geographical positioning data of the ego vehicle corresponding to the co-occurrence of the determined change of speed and the determined presence of the at least one unknown traffic object in the surrounding environment of the ego vehicle;

associating, by the processing unit, the co-occurrence to the obtained geographical positioning data;

determining, by the processing unit, a confidence value based on confidence criteria comprising a calculated frequency of the association of the co-occurrence to the obtained geographical positioning data; and if the determined confidence value exceeds a predetermined confidence threshold value:

automatically selecting and storing, by the processing unit, the one or more images of the at least one unknown traffic object for forming the training data set for the ML algorithm configured for identification of the at least one unknown traffic object.

5. The computer-implemented method according to claim 1, wherein the ego vehicle comprises an Automated Driving System; (ADS).

6. The computer-implemented method according to claim 1, wherein the method further comprises:

storing the one or more selected images in a memory unit of the ego vehicle for generating the corresponding traffic object identification annotation for the one or more images of the at least one unknown traffic object for forming the training data set for the ML algorithm.

7. The computer-implemented method according to claim 6, wherein the method further comprises:

determining, by the processing unit, based on the selected one or more images of the at least one unknown traffic object, that the at least one unknown traffic object is indicative of a built-up area; and generating, by the processing unit, the corresponding traffic object identification annotation for the selected one or more images of the at least one unknown traffic object indicative of the built-up area.

8. The computer-implemented method according to claim 7, wherein the method further comprises:

indicating, by the processing unit, the at least one built-up area traffic object within map data associated with an HD map based on the one or more annotated images.

9. A non-transitory computer-readable storage medium storing one or more programs configured to be executed by one or more processors of an in-vehicle processing system, the one or more programs comprising instructions for performing the method according to claim 1.

10. A system for generating training data for a machine learning (ML) algorithm configured for identification of at least one unknown traffic object on a road, the system comprising a processing circuitry configured to:

obtain sensor data from a sensor system of an ego vehicle travelling on the road, the sensor data comprising one or more images, captured by a vehicle-mounted camera, of a surrounding environment of the vehicle and information indicative of a speed of the ego vehicle and/or speed of at least one external vehicle;

determine a presence of at least one unknown traffic object in the surrounding environment of the ego vehicle based on the obtained sensor data;

determine a change of speed of the ego vehicle and/or of the at least one external vehicle travelling on the road and being present in the surrounding environment of the ego vehicle, based on the obtained sensor data; wherein, said change of speed corresponds to a substantially consistent new vehicle speed which is maintained by the ego vehicle and/or by the at least one external vehicle for at least a predetermined period of time; and in an instance of a co-occurrence of the determined change of speed and the determined presence of the at least one unknown traffic object in the surrounding environment of the ego vehicle:

select one or more images of the at least one unknown traffic object for forming a training data set for the ML algorithm configured for identification of the at least one unknown traffic object.

11. The system according to claim 10, wherein the processing circuitry is further configured to:

transmit the selected one or more images of the at least one unknown traffic object to a remote server and/or store the selected one or more images in a memory unit of the ego vehicle for a subsequent transmission to the remote server, for generating a corresponding traffic object identification annotation for the one or more images of the at least one unknown traffic object for forming the training data set for the ML algorithm.

12. The system according to claim 10, wherein the processing circuitry is further configured to:

obtain a geographical positioning data of the ego vehicle corresponding to the co-occurrence of the determined change of speed and the determined presence of the at least one unknown traffic object in the surrounding environment of the ego vehicle;

associate the co-occurrence to the obtained geographical positioning data;

determine a confidence value based on confidence criteria comprising a calculated frequency of the association of the co-occurrence to the obtained geographical positioning data; and if the determined confidence value exceeds a predetermined confidence threshold value:

select the one or more images of the at least one unknown traffic object for forming the training data set for the ML algorithm configured for identification of the at least one unknown traffic object.

13. The system according to claim 10, wherein the processing circuitry is further configured to:

store the one or more selected images in the memory unit of the ego vehicle, and wherein the processing circuitry is further configured to generate the corresponding traffic object identification annotation for the one or more images of the at least one unknown traffic object for forming the training data set for the ML algorithm.

14. A vehicle comprising:

one or more vehicle-mounted sensors configured to monitor a surrounding environment of the vehicle;

a localization system configured to monitor a geographical position and heading of the vehicle; and a system according to claim 10.

\* \* \* \* \*